(12) United States Patent
Haya et al.

(10) Patent No.: US 11,336,165 B2
(45) Date of Patent: May 17, 2022

(54) CURVILINEAR MOTOR

(71) Applicant: ROCKWELL AUTOMATION TECHNOLOGIES, INC., Mayfield Heights, OH (US)

(72) Inventors: Oliver C. Haya, Milwaukee, WI (US); Marc Koeppel, Union, KY (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 294 days.

(21) Appl. No.: 15/938,636

(22) Filed: Mar. 28, 2018

(65) Prior Publication Data

US 2019/0305661 A1 Oct. 3, 2019

(51) Int. Cl.
*H02K 41/02* (2006.01)
*B65G 54/02* (2006.01)
*H02K 1/12* (2006.01)
*B60L 13/03* (2006.01)

(52) U.S. Cl.
CPC .............. *H02K 41/02* (2013.01); *B60L 13/03* (2013.01); *B65G 54/02* (2013.01); *H02K 1/12* (2013.01)

(58) Field of Classification Search
CPC ........... B60L 13/03; B65G 54/02; H02K 1/12; H02K 41/02; H02K 11/215; H02K 1/16; H02K 2213/03; H02K 41/031
USPC ...................................................... 310/12.24
See application file for complete search history.

(56) References Cited

U.S. PATENT DOCUMENTS

| | | | | |
|---|---|---|---|---|
| 3,695,513 A * | 10/1972 | Baynes | ................... | A63H 18/02 238/10 E |
| 6,155,177 A * | 12/2000 | Backfisch | .............. | A63H 19/30 104/124 |
| 8,011,995 B1 * | 9/2011 | Todd | ....................... | A63H 19/30 446/446 |
| 8,384,251 B2 * | 2/2013 | Shikayama | .......... | H02K 11/215 310/12.02 |
| 8,601,729 B2 * | 12/2013 | Pitcher | ................ | G09F 15/0018 160/135 |
| 8,763,792 B2 * | 7/2014 | Iwasaki | ................... | B65G 35/00 198/339.1 |
| 10,118,775 B2 * | 11/2018 | Walter | ..................... | H02K 41/02 |
| 2012/0145500 A1 * | 6/2012 | Staunton | ................. | H02J 50/40 191/10 |
| 2013/0228415 A1 * | 9/2013 | Iwasaki | ..................... | B23Q 7/04 198/339.1 |
| 2014/0331888 A1 * | 11/2014 | Wernersbach | ........ | B60L 13/006 104/282 |
| 2015/0077023 A1 * | 3/2015 | Wernersbach | .......... | H02P 31/00 318/5 |
| 2015/0137625 A1 * | 5/2015 | Achterberg | ............ | H02K 11/30 310/12.09 |
| 2015/0349618 A1 * | 12/2015 | Kleinikkink | ......... | H02K 15/024 310/12.19 |

(Continued)

*Primary Examiner* — Alex W Mok
(74) *Attorney, Agent, or Firm* — Fletcher Yoder, P.C.

(57) ABSTRACT

A linear motor system has multiple modular track sections joined end-to-end to form a track along which movers may be displaced by the control of magnetic fields generated by coils disposed in each track section. A curved track section is provided that includes a curved portion, an integral straight portion, and a fit spline transition between the curved portion and the straight portion. The integration of the straight portion smooths the transition between the curved and straight areas of the track, and allows for improved performance.

20 Claims, 5 Drawing Sheets

(56) References Cited

U.S. PATENT DOCUMENTS

| | | | |
|---|---|---|---|
| 2016/0218608 A1* | 7/2016 | Floresta | H02K 3/493 |
| 2016/0243944 A1* | 8/2016 | Staunton | H02J 50/90 |
| 2016/0325938 A1* | 11/2016 | King | B65G 35/06 |
| 2017/0081135 A1* | 3/2017 | Wernersbach | B60L 13/006 |
| 2017/0189822 A1* | 7/2017 | Lopatinsky | A63H 18/16 |
| 2017/0320683 A1* | 11/2017 | Walter | B65G 54/02 |

* cited by examiner

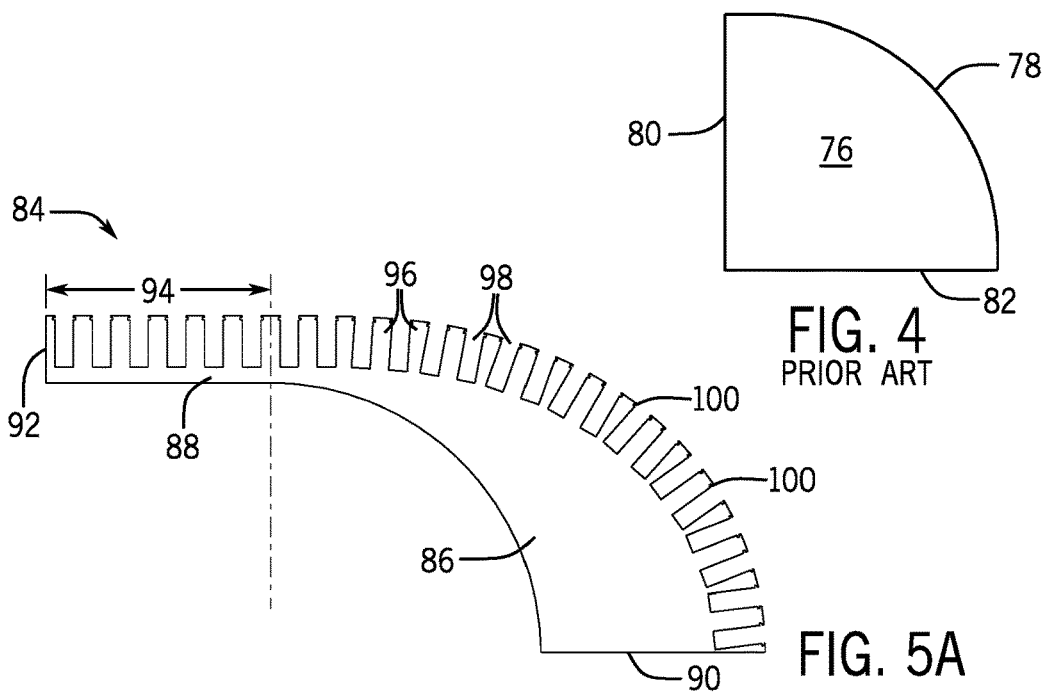
FIG. 4 PRIOR ART
FIG. 5A
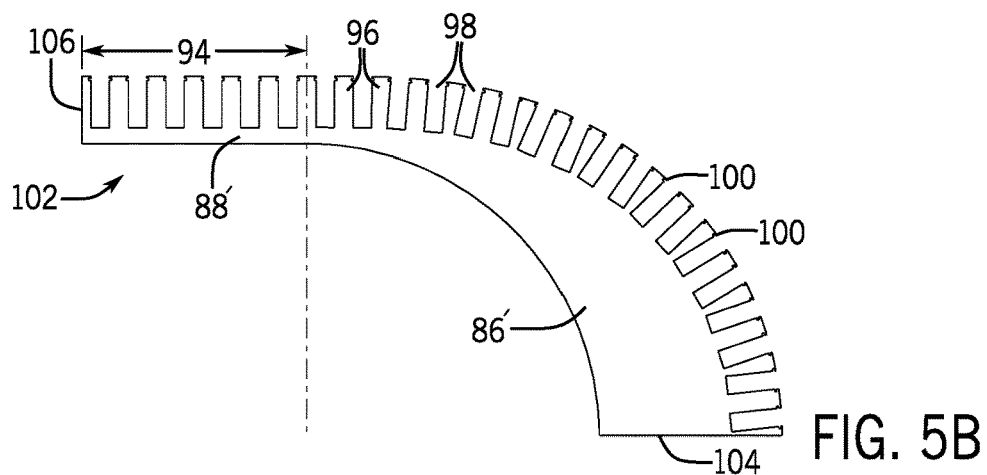
FIG. 5B
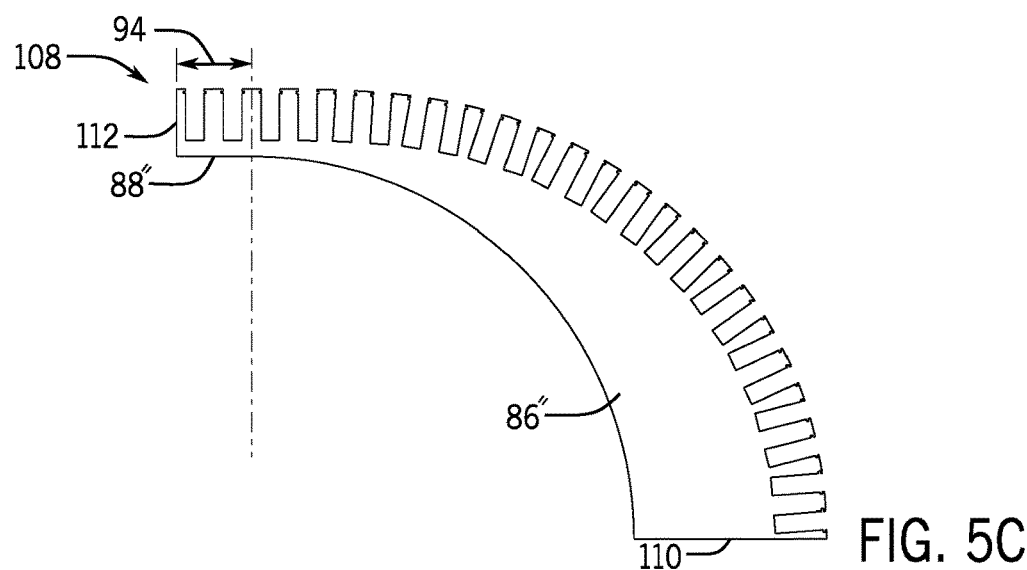
FIG. 5C

//CURVILINEAR MOTOR

BACKGROUND

The invention relates generally to linear motor systems having curved sections, and more particularly, to motors in which modular track and motor sections have both integral linear and curved portions.

A range of linear motors are known and in use throughout industry, particularly in manufacturing, filling, and material handling applications. Such motors typically include an elongated track in which motor coils are associated with a stator core, such as a laminated core. The coils may have various orientations, depending upon the motor design. A permanent magnet mover may be placed on the track, and fields resulting from selective energization of the track coils interact with permanent magnets of the mover to cause the mover to move along the track in desired directions, speeds, and accelerations, and to stop and start at desired locations. Highly flexible and precise control of movement of one or many movers may be achieved by control and driver circuitry associated with the coils of the track sections.

Because available track sections may need to be designed for a wide range of applications, orientations, and path layouts, they are typically made modular. Currently available tracks include either straight sections or curved sections, and these are typically joined end-to-end to provide the desired transport path for the movers. At turns or curves, modular curved sections may be joined to form various angles, such as 45 degrees, 90 degrees, and 180 degrees. Following a desired change in direction, then, the ends of the curved sections are joined with modular straight sections to continue the desired layout.

While such modular designs provide highly flexible design alternatives, they are not without drawbacks. For example, in view of the design and architecture of control and drive circuitry, existing designs are constrained to a number of coils per section that is a multiple of the coil pitch (e.g., N or 3N) in modular sections. This may severely limit the availability of an optimal design, particularly where small curves or tighter turns are desired. Moreover, points where curved sections join straight sections create problems with cogging owing to a localized flux gap and such locations, as well as with back electromotive force (BEMF), and to gaps in feedback from sensors used to regulate position and motion. Further, split bearing rails are commonly employed at such locations, leading to issues with impulsive force disturbances when bearing wheels traverse the split. Finally, position following errors tend to stack up at the curve-to-straight transition area of the tracks.

There is a need, therefore, for improved linear motor designs that can address at least some of these concerns.

BRIEF DESCRIPTION

The present disclosure relates to linear motor systems designed in view of such needs. In accordance with certain aspects of the disclosure, a linear motor system comprises a modular straight track section, and a modular curved track section having a curved portion of complex curvature and an integral straight portion, the straight portion being positionable adjacent to the modular straight track section to provide a smooth transition between the modular curved track section and the modular straight track section. A permanent magnet mover is configured to be displaced by a controlled magnetic field. Each track section comprises a plurality of coils energizable to create the controlled magnetic field for movement of the mover, and each track section is configured to support and guide the mover in movement along the track sections. Control and driver circuitry is coupled to the coils and configured to control energization of the coils to create the controlled magnetic field.

In accordance with another aspect of the disclosure, a linear motor system comprises a first modular track section, and a second modular track section having a curved portion of complex curvature and an integral straight portion, the straight portion being positionable adjacent to the first modular track section to provide a smooth transition between the second modular track section and the first modular track section. A permanent magnet mover is configured to be displaced by a controlled magnetic field. Each track section comprises a plurality of coils energizable to create the controlled magnetic field for movement of the mover, and each track section is configured to support and guide the mover in movement along the track sections. Control and driver circuitry is coupled to the coils and configured to control energization of the coils to create the controlled magnetic field.

In accordance with a further aspect of the disclosure, a linear motor system comprises a plurality of modular track sections joined end-to-end to form a track, at least one of the modular track sections comprising a modular curved track section having a curved portion and an integral straight portion. A permanent magnet mover is configured to be displaced by a controlled magnetic field. Each track section comprises a plurality of coils energizable to create the controlled magnetic field for movement of the mover, and each track section is configured to support and guide the mover in movement along the track sections. Control and driver circuitry is coupled to the coils and configured to control energization of the coils to create the controlled magnetic field. The track has only straight-to-straight track section transitions.

DRAWINGS

These and other features, aspects, and advantages of the present invention will become better understood when the following detailed description is read with reference to the accompanying drawings in which like characters represent like parts throughout the drawings, wherein:

FIG. 4 is a schematic representation of a portion of a prior art curved track module joined to a straight track module;

FIGS. 5A-5C are plan views of example stator arrangements for modular track sections having integral curved and straight portions.

DETAILED DESCRIPTION

Figure 1A:
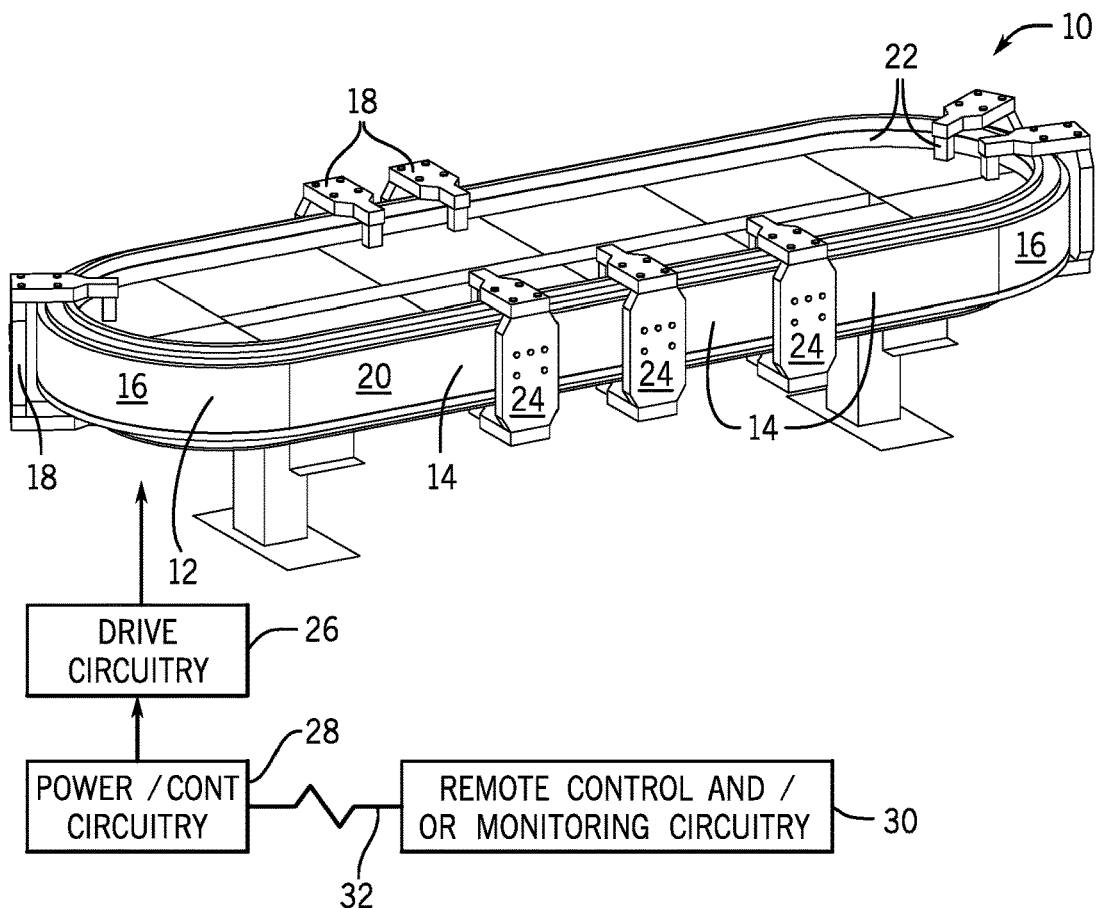
FIG. 1A is a perspective view of an exemplary linear motor system illustrating straight and curved track modules and several movers positioned for movement along the modules.

Turning now to the drawings, and referring first to FIG. 1A, a linear motor system 10 as illustrated for moving articles or products around a track 12. As will be appreciated by those skilled in the art, in many applications, the linear motor system will be configured to inter-operate with other machines, robots, conveyers, control equipment, and so forth (not separately shown) in an overall automation, packaging, material handling or other application. The linear motor system itself generally comprises a "linear motor" as discussed below, in which the moving components are positioned, accelerated, decelerated, and generally moved under the influence of controlled magnetic and electromagnetic fields. In the illustrated embodiment, the track 12 comprises straight track modules 14 and curved track modules 16. As discussed below, at least one of the curved track modules incorporates an integral straight section as well. These modules may be generally self-contained and mountable in various physical configurations, such as the oval illustrated in FIG. 1A. It should be noted that other configurations are equally possible as discussed below. The configurations may form closed loops of various shapes, but may also comprise open-ended segments. The system further comprises one or more movers 18 which are mounted to and movable along the track. Again, the position, velocity, acceleration, and higher order derivative parameters are controllable for these movers by appropriate control of the coils of the system that are energized and de-energized as discussed below. In the illustrated embodiment, the movers 18 interact with stationary elements in and around an outer periphery 20 of the track modules, although other configurations are envisaged. A sensor system 22 is provided to detect positions of the movers around the track, and such center systems may comprise permanent magnets, energized coils, Hall effect sensors, or any other suitable devices. In general, one component of the sensor system will be mounted on the movers, while another component will be mounted at fixed locations around the track.

Each mover further comprises a mounting platform 24. In an actual implementation, various tools, holders, support structures, loads, and so forth may be mounted to this mounting platform. The movers themselves may be configured differently from those shown in order accommodate the various loads. While a horizontal configuration is illustrated in FIG. 1A, other orientations may also be provided, such as ones in which the illustrated oval is generally stood on a side or end, or at any angle between.

The system further comprises circuitry for controlling a movement of the movers. In the embodiment illustrated in FIG. 1A, this circuitry includes a drive circuitry 26 that provides signals to each track module, and specifically individual coils (see below) of the track modules to create electromotive forces that interact with magnets on the modules to drive the modules to specific locations, and at specific velocity, accelerations, and so forth. This drive circuitry may typically include inverter circuitry that makes use of power electronic switches to provide drive power to the individual coils of each module in a controlled manner. In some embodiments, the drive circuitry may be included in each individual module, and signals provided to the drive circuitry by power and control circuitry 28. This power and control circuitry (and the drive circuitry) may receive feedback from the movers and/or from the sensor system to detect the location, velocity, acceleration, and so forth of each mover. In certain embodiments the movers may also be configured to be recognized by the power and control circuitry 28 as individual axes that are independently controlled, but with regulation of their position, velocity and acceleration to avoid conflicts, collisions, and so forth. The particular motion profile implemented by the power and control circuitry 28 will typically be configured and implemented upon the design and commissioning of the system, here again, depending upon the particular task to be performed. Finally, various remote control and/or monitoring circuitry 30 may be provided and this circuitry may be linked to the system by one or more networks 32. Such remote circuitry may generally allow for coordination of the operation of the transport system with other automation components, machine systems, manufacturing and material handling machines, and so forth.

Figure 1B:
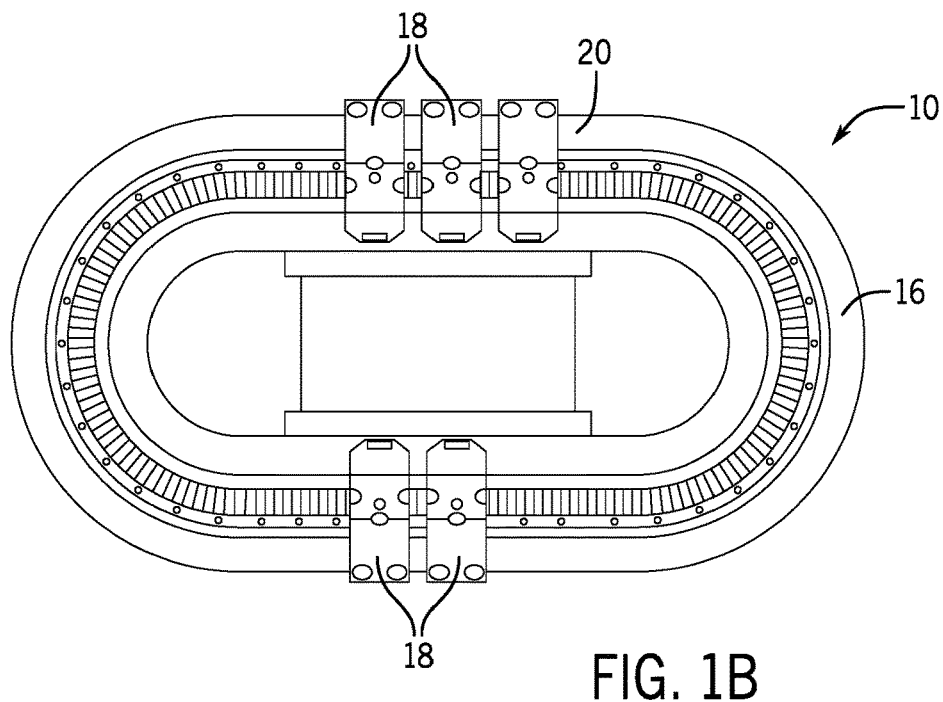
FIG. 1B is a top view of a similar linear motor system in which motor coils are positioned differently than in the system of FIG. 1A.

FIG. 1B illustrates an alternative configuration for a similar linear motor system. However, in this configuration, rather than motor coils being positioned around the periphery of the system, coils are positioned around the top of the system, in a generally planar arrangement. Magnet assemblies of each mover 16 face these coils and are spaced from the coils by a small air gap. Straight and curved track modules are assembled, as above, to form an oval, although other shapes and layouts may be formed. The curved track modules may be adapted with modified spline geometries, as in the case of the system shown in FIG. 1A, and as described in greater detail below. Moreover, in this embodiment as well, at least one of the curved modules comprises an integral straight section.

Figure 2:
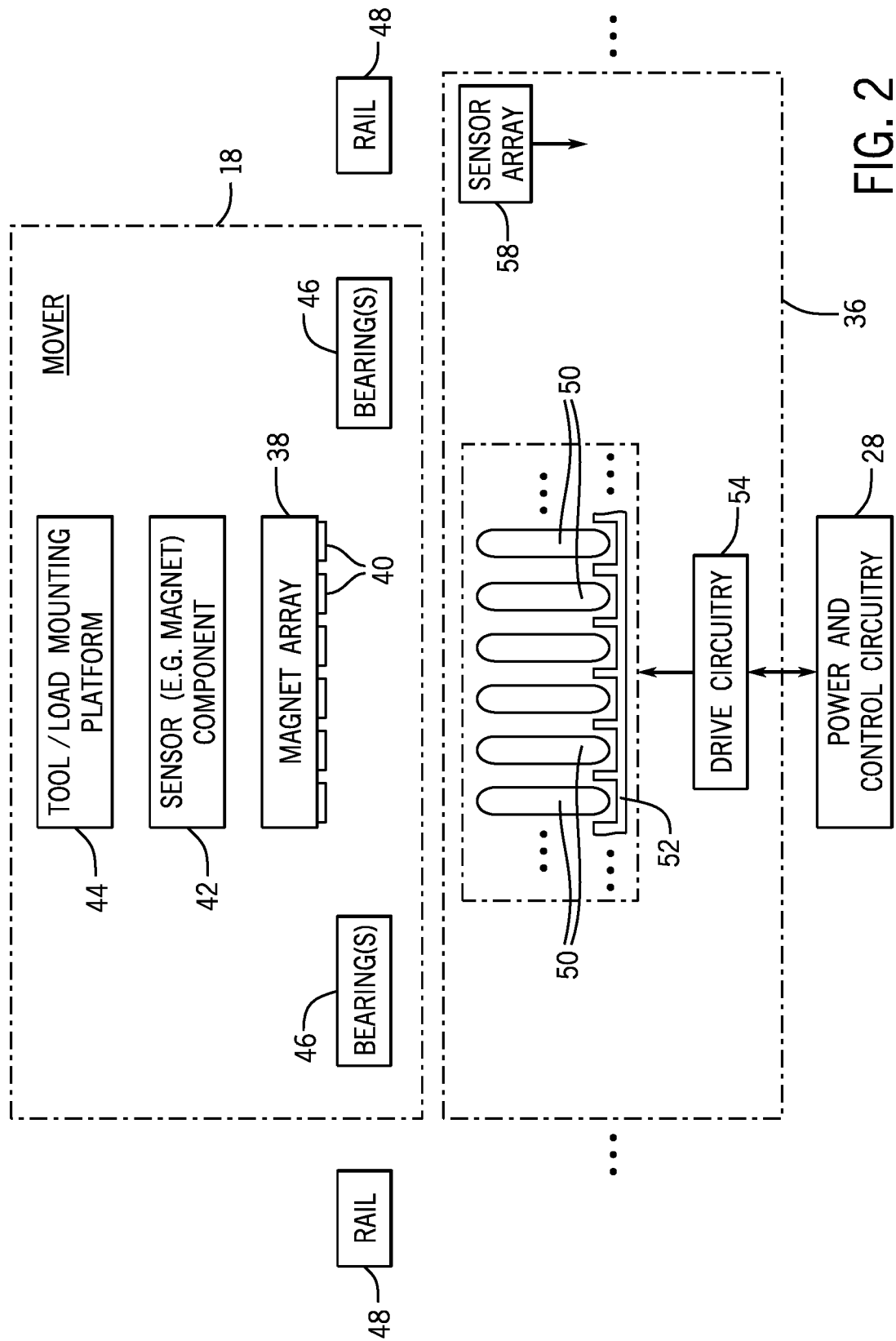
FIG. 2 is a diagrammatical representation of the system of FIGS. 1A and 1B.

FIG. 2 is a diagrammatical representation of the linear motor system showing one track module 36 and one mover 18 positioned along the track module. The track module illustrated in FIG. 2 may be a straight or curved track module, these two differing in their physical configuration, and certain of the actual characteristics owing to the curved nature of the curved modules as discussed below. In general, however, each mover comprises a magnet array 38 on which a number of magnets 40 are mounted. These will typically be permanent magnets and are mounted such that a small air gap is provided between the magnets and coils of the track module described below. As shown in FIG. 2, the track module 36 further comprises a sensor component 42, such as a permanent magnet. It should be noted, however, that the particular sensor component included in the track module will depend upon the nature of the sensing strategy, the sensing resolution, the position of the sensor on the mover (and cooperating components on the track module), and so forth. The platform 44 is provided on the mover while mounting tools and the like as discussed above. Finally, bearings and associated components (e.g., rollers) are mounted to the mechanical structure of the mover and serve to interact with one or more rails, as indicated by reference numerals 46 and 48, respectively. These bearings and rails allow the mover to remain securely attached to the track modules while allowing relatively free movement of the movers along the track modules and supporting mechanical loads and forces encountered during motion.

The track module 36 will typically include a series of parallel coils 50 that are associated with a stator or armature 52. In currently contemplated embodiments, these coils are mounted into slots in the stator, and the stator itself may be made of magnetic material formed into a stack of laminates and structured to allow for mounting within the track module housing. Particular configurations, magnetic, mounting structures and the like of the coils and stator components are generally beyond the scope of the present disclosure. Drive circuitry 54 may be included in each module as discussed above to allow for controlled power signals to be applied to the coils in order to drive and position the movers appropriately around the track module. Finally, a sensor array 56 is provided in each track module to allow for interaction with the sensor components of the movers. This sensor array will typically provide feedback that can indicate the position of the movers, and can be used to derive velocity, acceleration, jerk and other motion parameters. In the illustrated embodiment a plurality of track modules may be mounted end-to-end and interconnected with one another and/or with the power and control circuitry to received signals used to power the coils.

As will be appreciated by those skilled in the art, track modules, along with the magnet arrays of the movers, will generally form what may be considered a linear motor system. That is, electromotor force is generated by the controlled fields of the coils and interaction between these fields and the magnetic fields of the magnet array serve to drive the mover into desired positions, at desired speeds, and so forth. As noted above, these coils and the linear motor itself may be designed in accordance with various configuration strategies, such as ones having the coils arranged around a periphery of the track modules, ones in which the coils are generally planar (in a top or bottom position of the modules), and so forth. Although the "linear" motor system may be used in the present disclosure, it should be appreciated that curved modules in various configurations are intended to be included under this rubric.

Figure 3A:
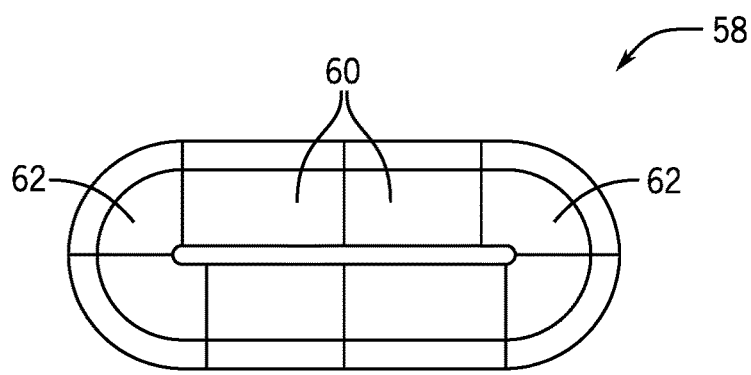
FIGS. 3A-3C are top views of exemplary alternative layouts for such systems, utilizing both straight and curved track modules.
Figure 3B:
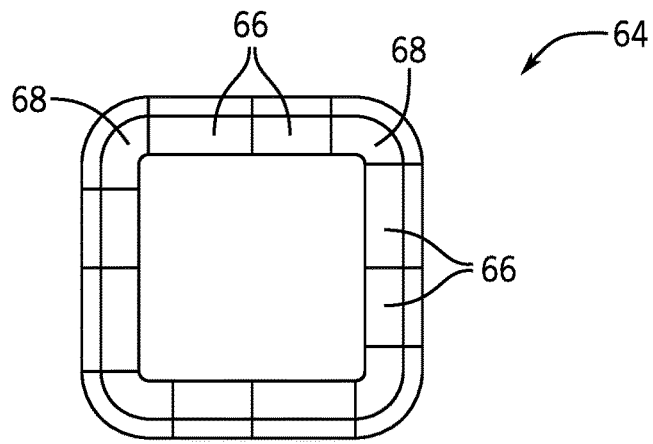
Figure 3C:
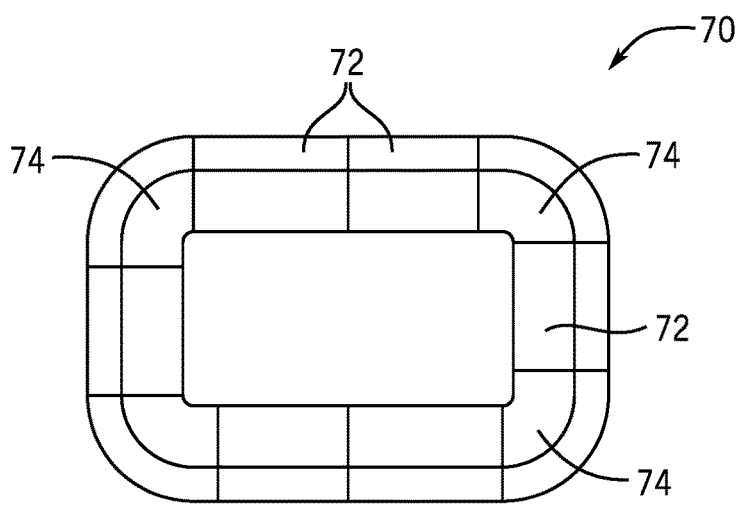

In addition to the configurations shown in FIGS. 1A and 1B, various other physical layouts may be employed, such as those shown in FIGS. 3A, 3B and 3C. FIG. 3A illustrates a linear motor system having an oval configuration 58. Here the configuration is made of several straight modules 60 and end modules 62 that form 180 degree curves. Any number of straight modules may be provided, and as described more fully below, the curved modules may be provided in a single unit forming 180 degrees to close the oval or in smaller units of 90 degrees, 45 degrees, 30 degrees, and so forth. As shown in FIG. 3B, square configurations 64 may be similarly formed by insertion of straight modules 66 between 90 degree modules 68. In the rectangular configuration 70 of FIG. 3C, straight modules 72 are inserted between 90 degree modules 74, with a different number of straight modules on each side to form a generally rectangular configuration. Other configurations may include various turns, interior and exterior curves, S-shapes, open-ended track sections, and so forth.

It should also be noted that a number of different coil and magnet configurations may be employed with the innovations summarized in the present disclosure. These may include, for example, the peripheral coil and facing magnet arrangements discussed above, and the generally planar coil arrangements with facing magnet arrangements also discussed above. Other arrangements may include opposing coils and/or magnets, with the cooperating magnets/coils in facing relation, T-shaped magnet and/or coil structures, and so forth.

As discussed in greater detail below, the curved track modules of the transport system are configured with an integral straight section. Certain prior art systems included curved track modules as illustrated in FIG. 4. These curved track modules 76 have a generally constant radius geometry 78 from an entry end to an exit end. Moreover, the curved modules extend around a portion of a curve only, and at ends of the curve must be joined to mating straight sections (at sides referenced by 80 and 82 in the figure). A number of disadvantages occur at the transition from curve to straight sections, as discussed above.

As provided by the present disclosure and through various alternative configurations discussed below, the curved track modules have a structure in which a portion of straight geometry is integral with a curved portion. In the present context, the curves themselves may have various geometries, including conventional constant radius curves, but also various non-constant radius geometries, such as cubic splines, Euler curves, clothoid curves, and so forth. More particularly, where splines are used, these may have a combination of two or more curve geometries, such as a cubic parabolic shape with a fit spline transition. Combinations of these geometries are also contemplated.

At noted above, each track section includes a stator which supports coils that can be energized during operation to create a magnetic field that causes movement of movers. In the assembled motor, the stator will be surrounded by a housing, and supports, as well as elements of the track that allow the mover to be mounted on it, and that retain and support the mover as it is displaced under the influence of the magnetic field. FIGS. 5A-5C illustrate certain examples of stators incorporating both curved and straight portions for modular track sections of the type contemplated.

FIG. 5A illustrates an example stator 84 for a modular track section having a curved portion 86 and an integral straight section 88. When a mover rounds the curved portion first, the entry of the modular section will be at end 90, and the exit will be at end 92. It is contemplated that the modular curved/straight sections will be entered and exited in this way, although movement could be in the opposite direction. In the illustrated embodiment, the curved section has a 300 mm wide spline curved section, while the length 94 of the straight section is 100 mm. As shown in the figure, teeth 96 of the stator form slots 98 in which coils will be assembled to form the finished modular track section of the linear motor. In the curved portion, angled teeth 100 allow for the curvature, while again accommodating the coils in the assembled product.

FIG. 5B illustrates a similar stator 102 for a modular track section having curved and integral straight portions. In this embodiment, a curved portion 86' has a 320 mm wide spline curve, while the straight portion 88' is again 100 mm long. The end 104 of the curved portion may serve as the entry end of the modular section, while the end 106 may serve as the exit end, although, again, the direction of movement could be reversed.

FIG. 5C illustrates another embodiment of a stator 108 having a curved portion 86" and an integral straight portion 88". In this embodiment, the curved portion has a 400 mm splined curve, while the straight portion has a length of 33.33 mm. Here end 110 of the curved portion may serve as the entry end, while end 112 may serve as the exit end, though again these may be reversed.

It should be noted from the foregoing that a wide range of sizes, lengths, and configurations may be envisioned for the curved and straight portions, and the overall specifications of the track sections. These may be adapted for anything from wide curves to extremely tight curves, with smooth, integral transitions to straight portions. Moreover, the number of coils, their spacing or pitch, the way they are disposed on or around the stator teeth, and so forth may vary depending upon such factors as the particular application, the desired movement, and so forth.

It should be noted, moreover, that the present disclosure contemplates the use of "complex" curvatures, that is, curved portions having at least two radii, curve generators, curve definitions, and so forth. For example, such complex geometries are described in U.S. Pat. No. 9,511,681, issued to Wernersbach et al. and entitled Controlled Motion System Having An Improved Track Configuration, which is hereby incorporated into the present disclosure by reference, in its entirety. However, the presently contemplated modules have integrated straight portions as well. Where complex geometries are used, the straight portions may be placed immediately adjacent to a curved portion having any desired geometry that enhances motion performance in the transition between the curved portion and the straight portion. Such curvatures next to straight portions may comprise, for example, spline curves, clothoid curves (e.g., $1^{st}$ and $2^{nd}$ order). Many complex curvatures may include at least one portion that is of a non-constant curvature. In all of these cases, and as described below, the angle made by the curved portion may span different numbers of degrees to create different paths, modular (e.g., combinable) track sections, and so forth. Similarly, and as also described below, one or more straight portions may be integrated with curved portions, including non-constant curvature portions and complex portions, including straight portions at one or both ends, and curved portions in intermediate positions (e.g., fully integrated in the modules between curved portions).

Figure 6A:
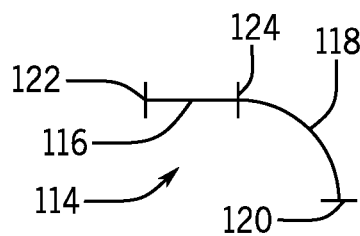
FIGS. 6A-6I are schematic representations of example modular track sections for linear motors according to embodiments of the present disclosure.
Figure 6B:
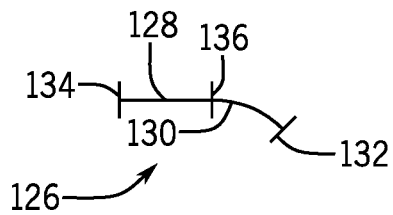
Figure 6C:
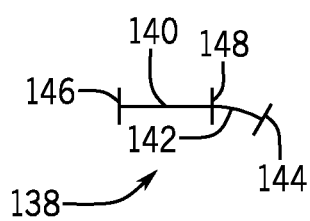
Figure 6D:
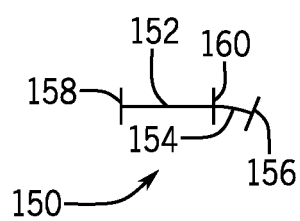
Figure 6E:
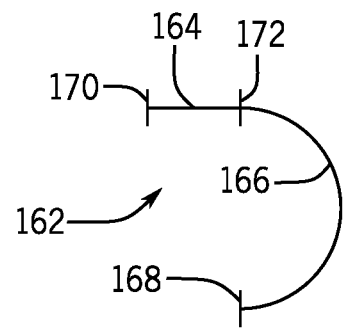

FIGS. 6A-6I illustrate a number of particular embodiments for such modular track sections having different geometries. FIG. 6A, for example, illustrates a modular track section 114 having a straight section 116 integral with a curved section 118. Similar to the embodiments discussed above, this embodiment has a first or "entry" end 120 and a second or "exit" end 122. A transition location 124 is disposed between the curved geometry of the curved section 118 and the straight section 116. In this case, the curved section 118 has a curvature that completes 90 degrees of movement in the module, though again this may be via circular radius, or any other desired curvature.

FIGS. 6B-6E illustrate similar modular track sections but with different angles of curvature. Section 126 of FIG. 6B, for example, has a straight portion 128 integral with a curved portion 130. The "entry" end is illustrated at 132, and the "exit" end at 134, with a transition 136 therebetween, after a curve of 45 degrees (again any desired radius or curvature may be used). The section 138 of FIG. 6C has a straight portion 140 integral with a curved portion 142 from an "entry" end 144 to an "exit" end 146, and a curve-to-straight transition at 148. Here the curvature spans approximately 33 degrees. The section 150 of FIG. 6D similarly has a straight portion 152 and a curved portion 154 between ends 156 and 158, with a transition at location 160. Here the curved portion spans only approximately 22.5 degrees. Finally, modular section 162 of FIG. 6E has a straight portion 164 and a curved portion 166 between ends 168 and 170, with a transition between these at location 172. Here the curved portion spans a full 180 degrees.

It should be apparent from the diagrams of FIGS. 6A-6E that any range of modular sections may be designed, made, stocked, and assembled to readily provide for different path geometries. Moreover, it should be noted that while the modular sections shown and described in the present disclosure generally present a concave curvature with a contemplated counterclockwise motion from left to right in the figures, the opposite curvature may, of course, be provided, that is, curving in the opposite direction from the "entry" end to the "exit" end.

Figure 6F:
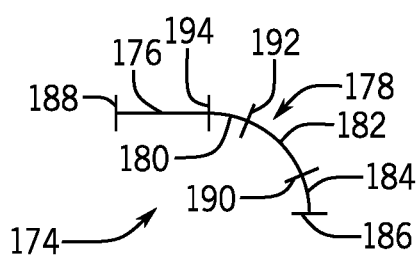
Figure 6G:
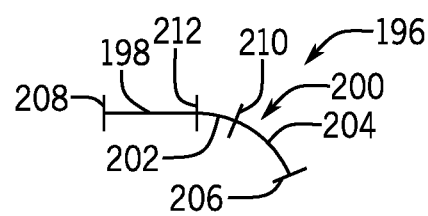

FIGS. 6F and 6G represent additional alternative embodiments that may be used with or in place of any of the foregoing. In these embodiments, more complex curvatures are utilized for the curved portions. For example, in FIG. 6F, modular track section 174 has a straight portion 176 integral with a curved portion 178. This curved portion 178 comprises multiple curvatures, however, including a first curved portion 180, a second curved portion 182, and a third curved portion 184. Here again, the curved portions lead from an "entry" end 186, to the "exit" end 188 of the straight portion, with transitions between curvatures at locations 190 and 192, and a transition to the straight portion at 194. The embodiment of FIG. 6G is a modular track section 196 having a straight portion 198 integral with a curved portion 200, where the curved portion extends around approximately 45 degrees and has two different curvatures in portions 202 and 204. From the "entry" end 206 to the "exit" end 208, the portions transition at locations 210 and 212.

Figure 6H:
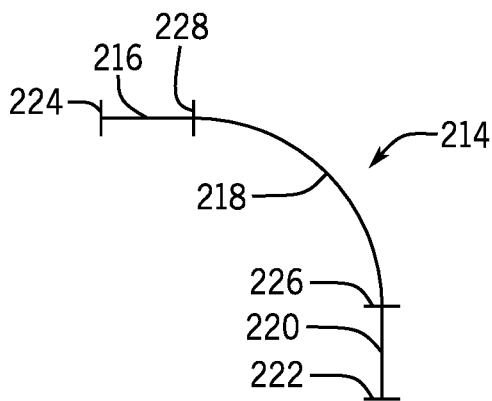
Figure 6I:
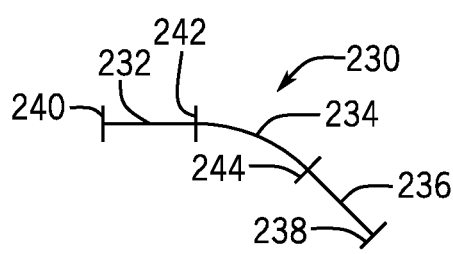

Still further, it is contemplated that modular track sections may be made with straight portions that are integral with curved portions at both ends of the curved portions, as illustrated in FIGS. 6H and 6I. In the embodiment of FIG. 6H, the modular track section 214 has a first straight portion 216 integral with a curved portion 218, and a further integral straight portion 220. The "entry" end 222 here is at the extremity of straight portion 220, while the "exit" end 224 is at the opposite end, that is, of straight portion 216. Transitions between the curved portion and the straight portions are shown at locations 226 and 228. In the embodiment of FIG. 6I, the modular track section 230 has straight portion 232 integral with curved portion 234, and further straight portion 236, between "entry" end 238 and "exit" end 240. Transitions between the curved and straight portions are shown at locations 242 and 244. The embodiment of FIG. 6I, however, only spans approximately 45 degrees. Clearly, such double-straight integrated curved sections may have all of the features discussed above, including different curvatures, multiple curvatures, different lengths of one or both straight portions, and so forth.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:
1. A linear motor system comprising:
a modular straight track section;
a modular curved track section having a curved portion of complex curvature, an integral straight portion, and a fit spline transition between the curved portion and the integral straight portion, the straight portion being positionable adjacent to the modular straight track section to provide a smooth transition between the modular curved track section and the modular straight track section;
a permanent magnet mover configured to be displaced by a controlled magnetic field;
wherein each track section comprises a plurality of stacked laminates forming slots, and a plurality of coils disposed in the slots and energizable to create the controlled magnetic field for movement of the mover, and each track section is configured to support and guide the mover in movement along the track sections; and
control and driver circuitry coupled to the coils and configured to control energization of the coils to create the controlled magnetic field;
wherein the complex curvature comprises a first portion having a spline or clothoid curvature adjacent to the straight portion and a second portion having a curvature different from the first portion.
2. The linear motor system of claim 1, wherein the modular curved track section has a curved portion extending around approximately 22.5 degrees.

3. The linear motor system of claim 1, wherein the modular curved track section has a curved portion extending around approximately 30 degrees.

4. The linear motor system of claim 1, wherein the modular curved track section has a curved portion extending around approximately 45 degrees.

5. The linear motor system of claim 1, wherein the modular curved track section has a curved portion extending around approximately 90 degrees.

6. The linear motor system of claim 1, wherein the modular curved track section has a curved portion extending around approximately 180 degrees.

7. The linear motor system of claim 1, wherein the modular curved track section has an integral straight portion on each of two opposite ends of the curved portion.

8. The linear motor system of claim 1, wherein the curved portion comprises a curvature of circular radius.

9. The linear motor system of claim 1, wherein the curved portion comprises at least two different curved portions each of a non-constant curvature.

10. The linear motor system of claim 1, wherein the curved portion comprises a first curvature of circular radius and a second non-circular curvature.

11. A linear motor system comprising:
a first modular track section;
a second modular track section having a curved portion of complex curvature, an integral straight portion, and a fit spline transition between the curved portion and the integral straight portion, the straight portion being positionable adjacent to the first modular track section to provide a smooth transition between the second modular track section and the first modular track section;
a permanent magnet mover configured to be displaced by a controlled magnetic field;
wherein each track section comprises a plurality of stacked laminates forming slots, and a plurality of coils disposed in the slots and energizable to create the controlled magnetic field for movement of the mover, and each track section is configured to support and guide the mover in movement along the track sections; and
control and driver circuitry coupled to the coils and configured to control energization of the coils to create the controlled magnetic field;
wherein the complex curvature comprises a first portion having a spline or clothoid curvature adjacent to the straight portion and a second portion having a curvature different from the first portion.

12. The linear motor system of claim 11, wherein the first modular track section comprises a straight track section.

13. The linear motor system of claim 11, wherein the first modular track section comprises a curved portion and an integral straight portion.

14. The linear motor system of claim 11, wherein the second modular track section has an integral straight portion on each of two opposite ends of the curved portion.

15. The linear motor system of claim 11, wherein the curved portion comprises a curvature of circular radius.

16. The linear motor system of claim 11, wherein the curved portion comprises a non-circular curvature.

17. The linear motor system of claim 11, wherein the curved portion comprises a first curvature of circular radius and a second non-circular curvature.

18. A linear motor system comprising:
a plurality of modular track sections joined end-to-end to form a track, at least one of the modular track sections comprising a modular curved track section having a curved portion of complex curvature, an integral straight portion and a fit spline transition between the curved portion and the integral straight portion;
a permanent magnet mover configured to be displaced by a controlled magnetic field;
wherein each track section comprises a plurality of stacked laminates forming slots, and a plurality of coils disposed in the slots and energizable to create the controlled magnetic field for movement of the mover, and each track section is configured to support and guide the mover in movement along the track sections; and
control and driver circuitry coupled to the coils and configured to control energization of the coils to create the controlled magnetic field; and
wherein the track has only straight-to-straight track section transitions;
wherein the complex curvature comprises a first portion having a spline or clothoid curvature adjacent to the straight portion and a second portion having a curvature different from the first portion.

19. The linear motor system of claim 18, wherein the modular curved track section has an integral straight portion on only one side of the curved portion.

20. The linear motor system of claim 18, wherein the curved portion comprises a non-circular curvature.

* * * * *